US007213145B2

(12) United States Patent
Sasmazel

(10) Patent No.: US 7,213,145 B2
(45) Date of Patent: May 1, 2007

(54) METHOD AND APPARATUS FOR SECURE INTERNET PROTOCOL COMMUNICATION IN A CALL PROCESSING SYSTEM

(75) Inventor: Levent Sasmazel, Holmdel, NJ (US)

(73) Assignee: Avaya Technology Corp., Basking Ridge, NJ (US)

( * ) Notice: Subject to any disclaimer, the term of this patent is extended or adjusted under 35 U.S.C. 154(b) by 924 days.

(21) Appl. No.: 10/043,589

(22) Filed: Jan. 10, 2002

(65) Prior Publication Data
US 2003/0131236 A1  Jul. 10, 2003

(51) Int. Cl.
*H04L 9/00* (2006.01)
(52) U.S. Cl. ...................... 713/153; 713/171
(58) Field of Classification Search .......... 380/257, 380/278, 44, 283; 713/151, 153, 171
See application file for complete search history.

(56) References Cited

U.S. PATENT DOCUMENTS

| 4,578,530 | A |   | 3/1986 | Zeidler |         |
|-----------|---|---|--------|---------|---------|
| 5,410,602 | A | * | 4/1995 | Finkelstein et al. | 380/281 |
| 5,724,426 | A |   | 3/1998 | Rosenow et al. |         |

(Continued)

FOREIGN PATENT DOCUMENTS

| JP | 5022283 | 1/1993 |
| JP | 6112936 | 4/1994 |

OTHER PUBLICATIONS

V. Varadharajan et al., "Key Management for a Secure LAN-SMDS Network," Elsevier Science Publishers, vol. 19, No. 9/10, pp. 813-823, Aug. 1996.

(Continued)

*Primary Examiner*—Kambiz Zand
*Assistant Examiner*—Andrew L. Nalven
(74) *Attorney, Agent, or Firm*—Ryan, Mason & Lewis, LLP

(57) ABSTRACT

Techniques for providing secure communications between two or more end units of a call processing system via a call complex or other communication system switch. The end units each generate a set of session key lists including a stack-based session key list for each of the terminals coupled thereto. The multiple sets of session key lists are communicated from the end units to the call complex in a secure manner as part of corresponding authentication protocols carried out between the end units and the call complex. In establishing secure communications between an originating end unit and one or more additional end units, the call complex selects, as an end unit to end unit session key, a session key from a session key list in a given one of the sets of session key lists associated with the originating end unit. The selected end unit to end unit session key is used to provide secure communications between the originating end unit and at least one other end unit via the call complex. The same end unit to end unit session key is preferably used for any additional end units subsequently conferenced into the secure communication channel between the originating end unit and a specified destination end unit. Upon termination of the secure communication channel, one or more new session keys can be generated for the affected terminals so as to maintain a desired minimum stack size for the session key lists.

25 Claims, 12 Drawing Sheets

U.S. PATENT DOCUMENTS 6,148,404 A * 11/2000 Yatsukawa ............... 726/2
6,275,573 B1 * 8/2001 Naor et al. ................ 379/194
2003/0046534 A1 * 3/2003 Alldredge .................. 713/153

OTHER PUBLICATIONS

C-H. Chang et al., "Efficient End-to-End Authentication Protocols for Mobile Networks," Personal, Indoor, Mobile Radio Communications, PIMRC '96, pp. 1252-1256, Oct. 1996.

J. Forné et al., "Hardware Implementation of a Secure Bridge in Ethernet Environments," Global Telecommunications Conference, 1993, IEEE, pp. 177-181, Nov. 1993.

K. Tanaka et al., "A Confidentiality System for ISDN Inter-PC High-Speed File Transfer," Computers & Security, Elsevier Science Publishers, vol. 15, No. 2, pp. 141-155, 1996.

Draft ITU-T Recommendation H.235, "Security and Encryption for H Series (H.323 and other H.245 based) Multimedia Terminals," pp. 1-37, Jan. 1998.

* cited by examiner

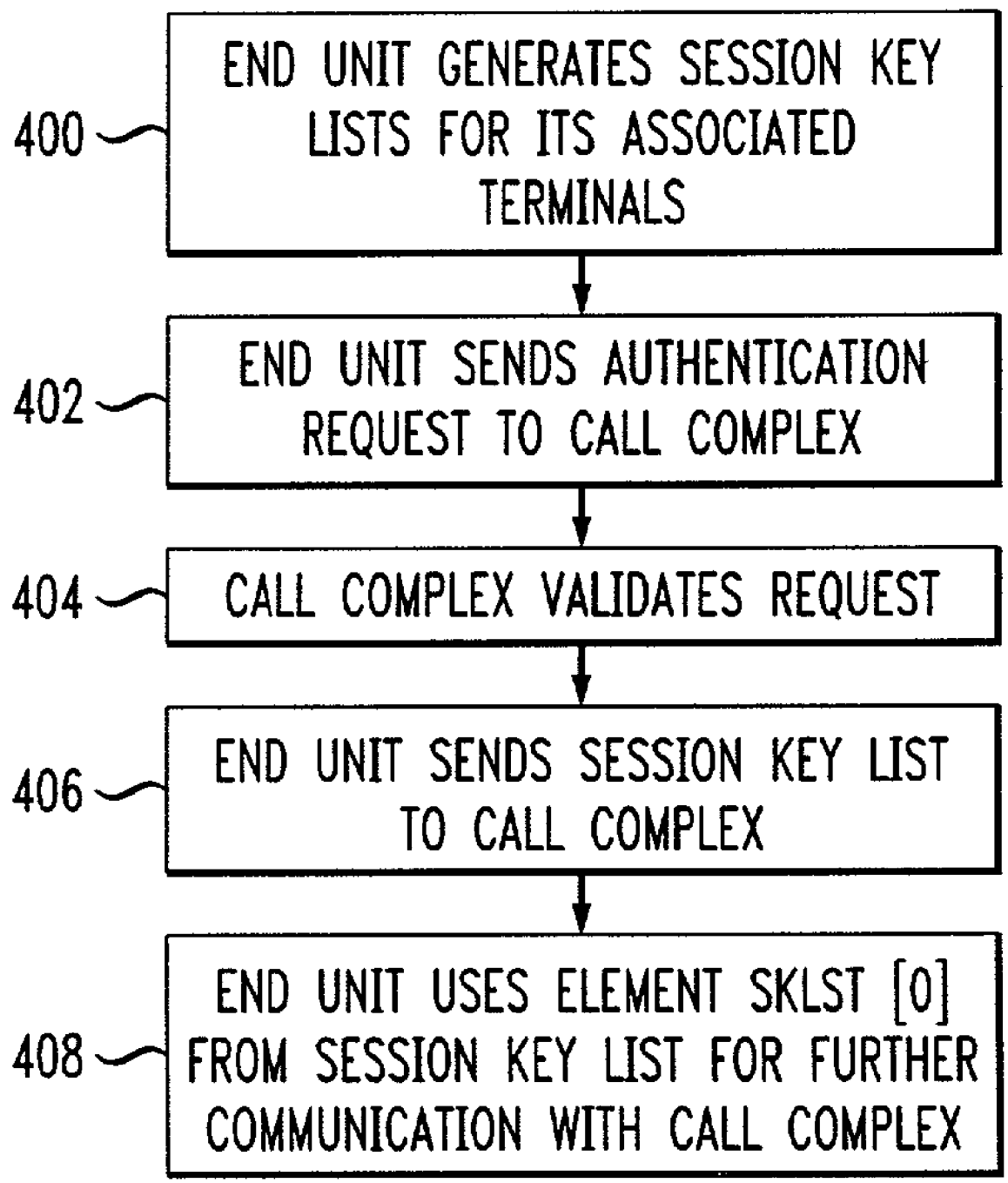

FIG. 5

| CALL COMPLEX | END UNIT |
|---|---|
| | END UNIT$_{SESSION\ KEY}$ = RANDOM()<br>ESKe = ENCRYPT (END UNIT$_{SESSION\ KEY}$) END UNIT$_{PRIVATE\ KEY}$<br>EEUIDe = ENCRYPT (END UNIT IDENTIFICATION) CALL COMPLEX$_{PUBLIC\ KEY}$<br>SendAuthenticationReq (EEUIDe, ESKe) |
| IDENTIFY REQUEST (VALIDATE REQUEST; IF IT IS NOT VALID, DROP IT)<br>END UNIT IDENTIFICATION = DECRYPT (EEUIDe) CALL COMPLEX$_{PRIVATE\ KEY}$<br>IF (END UNIT IDENTIFICATION) EXISTS GET END UNIT$_{PUBLIC\ KEY}$<br>END UNIT$_{SESSION\ KEY}$ = ENCRYPT (END UNIT$_{SESSION\ KEY}$) END UNIT$_{PUBLIC\ KEY}$<br>ACKe = ENCRYPT (ACK) END UNIT$_{SESSION\ KEY}$<br>CreateSessionInformation (IP ADDRESS, END UNIT IDENTIFICATION)<br>SendRegistrationAcknowledgement (ACKe) | |
| | SKLSTe = ENCRYPT (GenerateSessionKeyListForEndUnit()) END UNIT$_{SESSION\ KEY}$<br>SendSessionKeyList (SKLSTe) |
| SKLST = DECRYPT (SKLSTe)<br>END UNIT$_{SESSION\ KEY}$ = SKLST[0]<br>ACKe = ENCRYPT (ACK) END UNIT$_{SESSION\ KEY}$<br>SendSessionKeyListAcknowledgement (ACKe) | END UNIT$_{SESSION\ KEY}$ = SKLST[0] |

FIG. 6B

| END UNIT 1 | | CALL COMPLEX |
|---|---|---|
| ConfRequestTo (EXTENSION 311, EXTENSION 105) END UNIT<sub>SESSION KEY</sub> | → | IF INCOMING REQUEST IP ADDRESS NOT REGISTERED, DROP THE REQUEST<br>END UNIT<sub>SESSION KEY</sub> = FIND SESSION KEY FOR IP (REQUEST IP ADDRESS)<br>CALL REQUEST DATA = DECRYPT (INCOMING BUFFER) END UNIT<sub>SESSION KEY</sub><br>IF PLAINTEXT BUFFER DOES NOT CONTAIN END UNIT REGISTRATION NAME, DROP THE REQUEST |
| END UNIT 3 | | CALL COMPLEX |
| | ← | EUEUSK = SKLST[105]<br>MESSAGE KEY = get_key_for_extension (311)<br>SendIncomingConfRequest (ENCRYPT (oIP, 511, 105, EUEUSK) MESSAGE KEY) |
| IF INCOMING REQUEST IP ADDRESS NOT CALL COMPLEX, DROP THE REQUEST<br>PLAINTEXT BUFFER = DECRYPT (INCOMING BUFFER) END UNIT<sub>SESSION KEY</sub><br>IF PLAINTEXT BUFFER DOES NOT CONTAIN END UNIT REGISTRATION NAME, DROP THE REQUEST<br>SET EUEUSK<br>SendConfAcceptedInformation (RTP INFO) UNIT<sub>SESSION KEY</sub> | | |

FIG. 6D

| END UNIT 2 | | CALL COMPLEX |
|---|---|---|
| | → | EUEUSK-NEW = SKLST[105, NEXT] // GET NEXT SESSION KEY FROM EXTENSION 105 STACK<br>MESSAGE KEY = get_key_for_extension (201)<br>SendNewSessionKeyRequest<br>(ENCRYPT (oIP, 201, 105, EUEUSK)<sub>MESSAGE KEY</sub>) |
| IF INCOMING REQUEST IP ADDRESS NOT CALL COMPLEX, DROP THE REQUEST<br>PLAINTEXT BUFFER = DECRYPT (INCOMING BUFFER)<sub>END UNIT SESSION KEY</sub><br>IF PLAINTEXT BUFFER DOES NOT CONTAIN END UNIT REGISTRATION NAME, DROP THE REQUEST<br>SET EUEUSK TO EUEUSK-NEW<br>SendConfForNewSessionKeyRequest() UNIT<sub>SESSION KEY</sub> | | |

| END UNIT 1 | | END UNIT 2 |
|---|---|---|
| SendVoicePacket (ENCRYPT (PLAINTEXT BUFFER)<sub>EUEUSK-NEW</sub>)<br>ReceiveVoicePacket<br>(DECRYPT (INCOMING BUFFER)<sub>EUEUSK-NEW</sub>) | ↔ | ReceiveVoicePacket<br>(DECRYPT (INCOMING BUFFER)<sub>EUEUSK-NEW</sub>)<br>SendVoicePacket (ENCRYPT (PLAINTEXT BUFFER)<sub>EUEUSK-NEW</sub>) |

| END UNIT 1 | | END UNIT 2 |
|---|---|---|
| EndOfSession (ENCRYPT (PLAINTEXT BUFFER)<sub>EUEUSK-NEW</sub>) | → | CleanUp() |

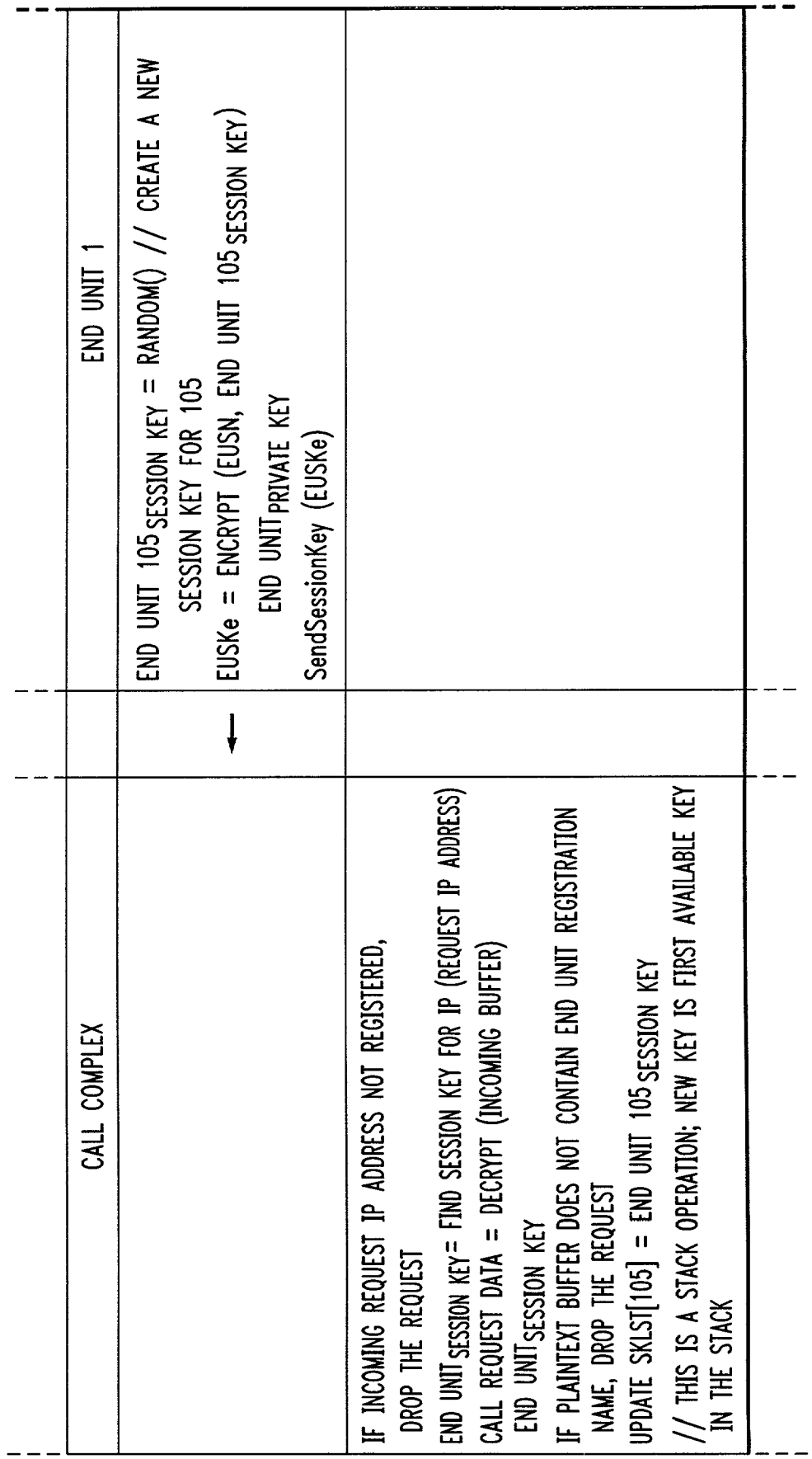
FIG. 6D CONT. (1)

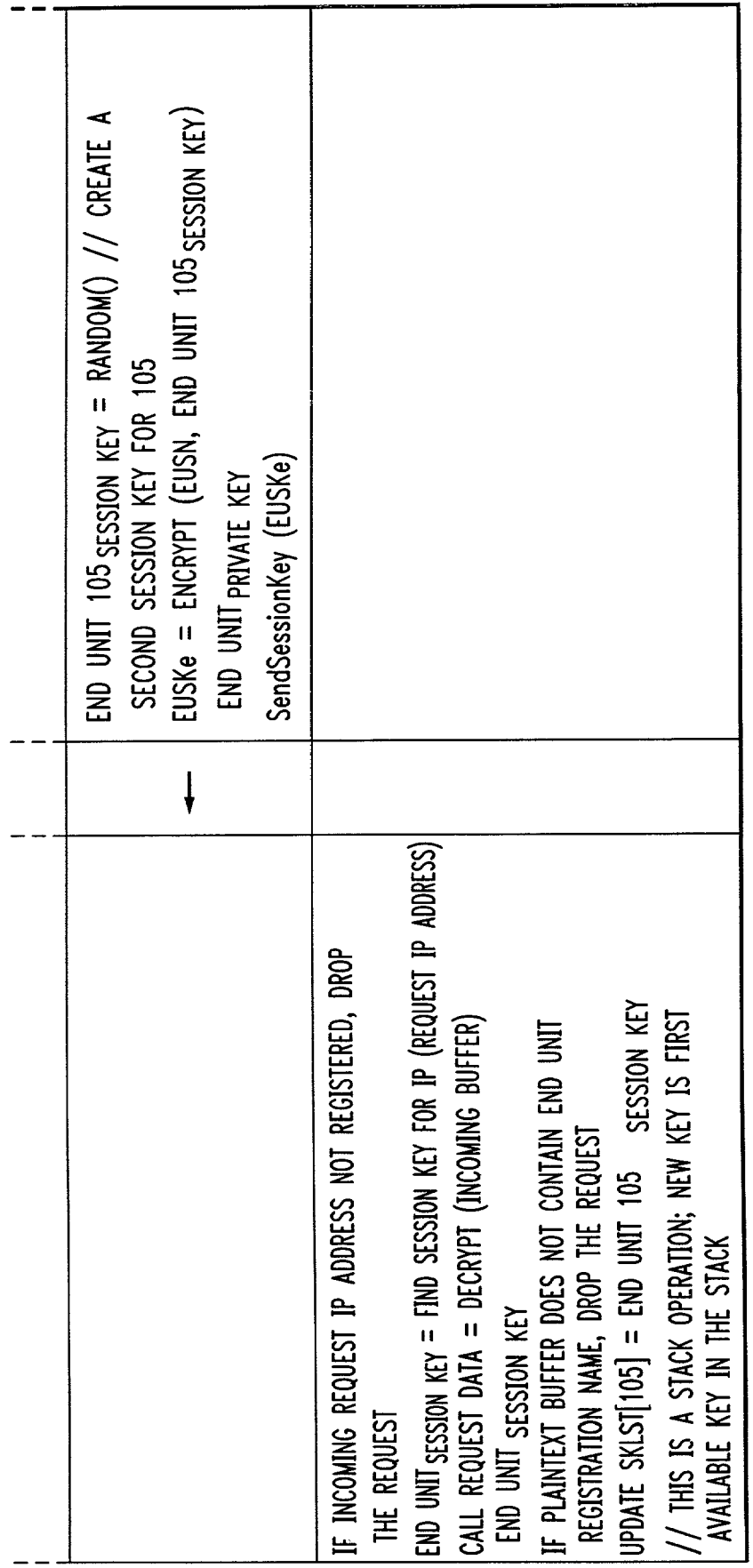
FIG. 6D CONT. (2)

METHOD AND APPARATUS FOR SECURE INTERNET PROTOCOL COMMUNICATION IN A CALL PROCESSING SYSTEM

FIELD OF THE INVENTION

The invention relates generally to call processing systems, and more particularly to systems in which calls or other communications are directed by a call complex or other switch to or from telephones, call concentrators, media gateways or other types of end unit devices.

BACKGROUND OF THE INVENTION

Many conventional communication system call complexes, such as private branch exchanges (PBXs) and other premises-based telephone switches, are not configured to provide adequate security for Internet protocol (IP) communications. The security of IP communications processed by certain conventional call complexes may therefore be undermined through a variety of different types of attacks, including IP spoofing, denial of service, etc. These security issues are becoming increasingly important with the growth of voice-over-IP (VoIP) communications using conventional call complexes.

The above-noted security issues have been addressed to a limited extent by the International Telecommunication Union (ITU) in Draft ITU-T Recommendation H.235, "Security and Encryption for H Series (H.323 and other H.245 based) Multimedia Terminals," January 1998, which is incorporated by reference herein. Unfortunately, this ITU-T Recommendation has a number of drawbacks. For example, the ITU-T Recommendation fails to provide adequate protocols and other techniques for functions such as key management and distribution, key setup and initialization, and adding participants to or dropping participants from a given call.

Although a wide variety of security solutions are known in the context of data transmission over the Internet, such solutions are often not directly applicable to the telephony-based call processing system context. For example, these existing data transmission solutions are often configured to operate with devices arranged in the form of a peer-to-peer network, and therefore do not provide techniques for conferencing multiple parties into a given secure channel or transferring a secure channel to another end unit device or application.

Without adequate security, conventional call processing systems configured to handle IP communications will continue to be vulnerable to the types of attacks noted above.

A need therefore exists for techniques for improving the security associated with the processing of IP communications as well as other communications in call complexes and end units of a call processing system.

SUMMARY OF THE INVENTION

The present invention meets the above-identified need by providing techniques for implementing secure communications between two or more end units of a call processing system via a call complex or other communication system switch.

In accordance with one aspect of the invention, the end units each generate a set of session key lists including a stack-based session key list for each of the terminals coupled thereto. The multiple sets of session key lists are communicated from the end units to the call complex in a secure manner as part of corresponding authentication protocols carried out between the end units and the call complex. More particularly, the set of session key lists for a given one of the end units may be supplied to the call complex in encrypted form by that end unit as part of an authentication protocol carried out between that end unit and the call complex.

A given one of the sets of session key lists may be stored in a memory of the call complex in the form of a data structure which includes at least a first session key element and a plurality of stack-based session key lists, with each of the stack-based session key lists including multiple session keys associated with a particular terminal coupled to the originating end unit. The first session key element is preferably utilizable in providing secure communications between the originating end point and the call complex.

In establishing secure communications between an originating end unit and one or more additional end units via the call complex, the call complex selects, as an end unit to end unit session key, a session key from a session key list in a given one of the sets of session key lists associated with the originating end unit. The selected end unit to end unit session key is used to provide secure communications between the originating end unit and at least one other end unit via the call complex.

In accordance with another aspect of the invention, the same end unit to end unit session key is preferably used for any additional end units subsequently conferenced into a secure communication channel established between the originating end unit and a specified destination end unit. For example, the same end unit to end unit session key may be used for communication with an additional terminal being conferenced into a call originating at a particular terminal associated with the originating end unit, subsequent to the connection of the call to a destination terminal associated with the destination end unit. A new end to end session key may then be selected from the session key list associated with the particular terminal after the additional terminal conferenced into the call is subsequently dropped from the call.

In accordance with a further aspect of the invention, upon termination of a secure communication channel, one or more new session keys can be generated for the affected terminals so as to maintain a desired minimum stack size for the session key lists. For example, upon completion of the secure communications originated by a particular terminal, the corresponding originating end unit may generate at least one additional session key which is added to the stack-based session key list for that particular terminal and is supplied to the call complex in a secure manner for storage. The additional session key may be used to provide subsequent secure communications between the originating end unit and at least one other end unit via the call complex.

Advantageously, the secure communication techniques of the present invention protect a call complex, end units and other elements of a call processing system from IP spoofing, denial of service, and other attacks. The invention thus allows IP communications to be implemented in a secure and efficient manner within such a call processing system.

BRIEF DESCRIPTION OF THE DRAWINGS

FIG. 4 is a flow diagram of an initialization process carried out between a call complex and an end unit in an illustrative embodiment of the invention.

FIG. 5 is a diagram illustrating an authentication portion of the FIG. 4 process in greater detail.

FIGS. 6A, 6B, 6C and 6D are diagrams illustrating interaction between a call complex and multiple end units in establishing secure communication between terminals coupled to the end units, using the techniques of the invention.

DETAILED DESCRIPTION OF THE INVENTION

The invention will be illustrated below in conjunction with an exemplary call processing system. Although well suited for use with, e.g., a system having a private branch exchange (PBX), or other call complex, the invention is not limited to use with any particular type of communication system or configuration of system elements. Those skilled in the art will recognize that the disclosed techniques may be used in any communication application in which it is desirable to provide improved security for Internet protocol (IP) communications or other similar types of communications processed by a call complex or other type of communication system switch.

The term "call" as used herein is therefore intended to include not only conventional telephone calls but also other communications such as voice-over-IP, data transmissions, facsimile, etc.

The term "switch" as used herein should be understood to include a PBX, an enterprise switch, or other type of telecommunications system switching device, as well as other types of processor-based communication control devices such as servers, computers, adjuncts, etc. A call complex is an example of one type of switch.

Figure 1:
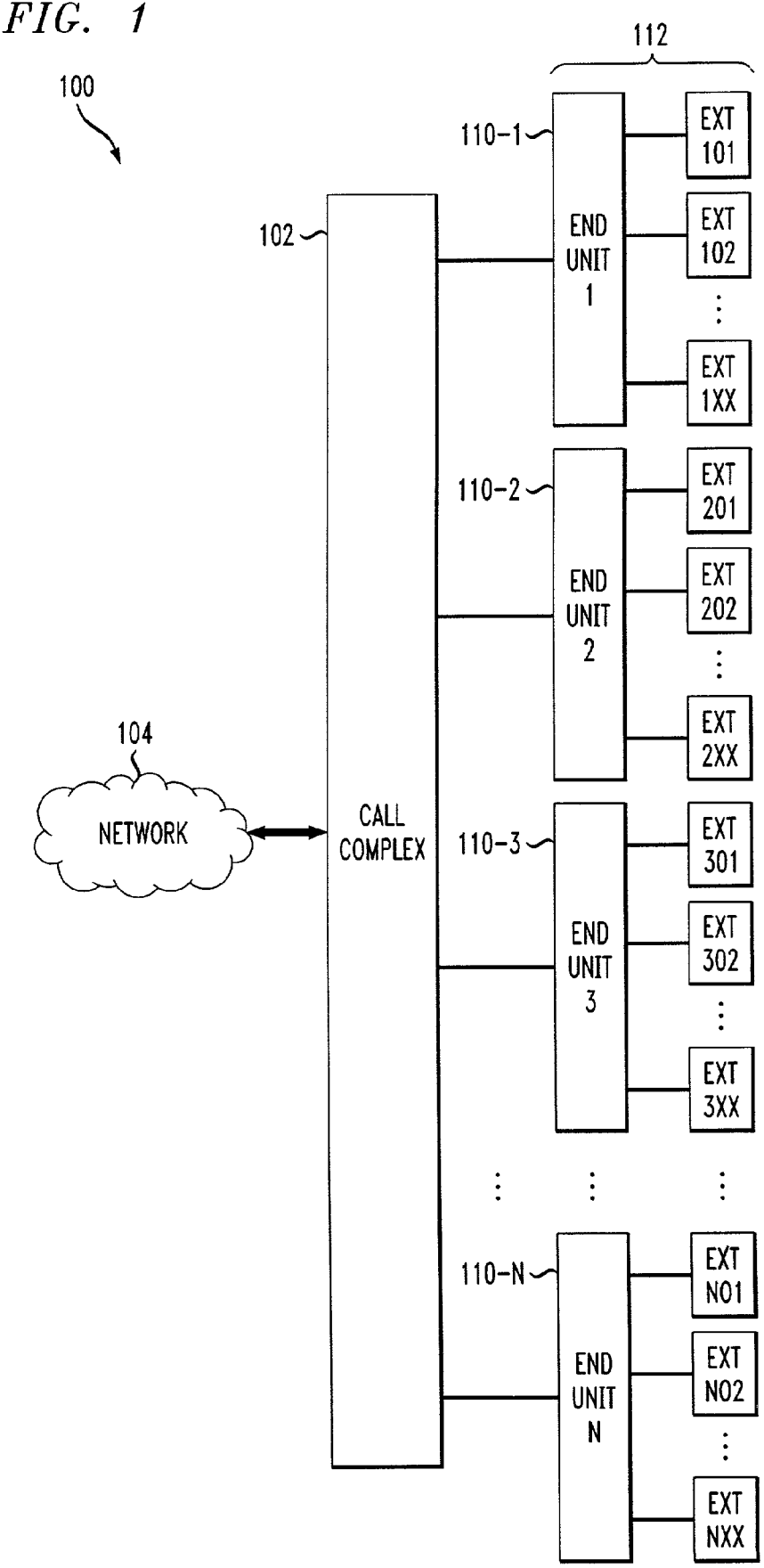
FIG. 1 shows an exemplary call processing system in which the invention is implemented.

FIG. 1 shows an exemplary communication system 100 in which the invention is implemented. The system 100 includes a call complex 102 which is coupled to a network 104 and to a number of end units 110-1, 110-2, . . . 110-N. The end units 110 have associated therewith a number of terminals 112. More particularly, associated with each of the end units 110-i, i=1, 2, . . . N, is a set of terminals denoted Extension i01, Extension i02, . . . Extension iXX. These extensions correspond generally to terminal endpoints serviced by the call complex 102, e.g., the call complex 102 can direct incoming calls to and receive outgoing calls from these extensions in a conventional manner.

The call complex 102 in the illustrative embodiment may be implemented, e.g., as an otherwise conventional DEFINITY® Enterprise Communication Service (ECS) communication system switch available from Avaya Inc. of Basking Ridge, N.J., USA. Additional details regarding this type of switch may be found in, e.g., DEFINITY® ECS, Release 9, Administration for Network Connectivity, Issue 2, Document No. 555-233-504, November 2000, which is incorporated by reference herein. Other types of known switches maybe configured to operate in accordance with the techniques of the invention. The conventional aspects of such switches are well known in the art and therefore not described in detail herein.

The end units 110 may be implemented as media gateways, remote concentrators, call center applications, interactive voice response (IVR) units, or portions or combinations of these and other devices.

Although each of the end units 110 in the illustrative embodiment of FIG. 1 is shown as having multiple terminals associated therewith, this is by way of example and not limitation. In other embodiments, one or more of the end units may itself be a single endpoint terminal coupled to the call complex. For example, a given one of the end units may itself be an IP telephone terminal or other type of wired or wireless terminal.

The terminals 112 may be wired desktop telephone terminals or any other type of terminals capable of communicating with the call complex 102. The word "terminal" as used herein should therefore be understood to include not only wired or wireless desktop telephone terminals, but also other types of processor-based communication devices, including but not limited to mobile telephones, personal computers, personal digital assistants (PDAs), etc.

The call complex 102 may be coupled to the network 104 via one or more trunk lines or other suitable communication media. Network 104 may represent, e.g., a public switched telephone network (PSTN), a global communication network such as the Internet, a wide area network, a metropolitan area network, a local area network, a wireless cellular network, or a satellite network, as well as portions or combinations of these or other communication networks.

It should be noted that the invention does not require any particular type of information transport media between call complex 102, network 104, end units 110 and terminals 112, i.e., the invention may be implemented with any desired type of transport medium as well as combinations of different types of transport media.

As will be described in greater detail below, the present invention in accordance with one aspect thereof involves configuring the call complex 102 and end units 110 so as to ensure secure communications between these elements. The invention is particularly well-suited for use in providing secure IP communications between call complex 102 and end units 110, but can also be used for other types of communications.

It should be emphasized that the configuration of the call complex, end units and terminals as shown in FIG. 1 is for purposes of illustration only, and should not be construed as limiting the invention to any particular arrangement of elements.

Figure 2:
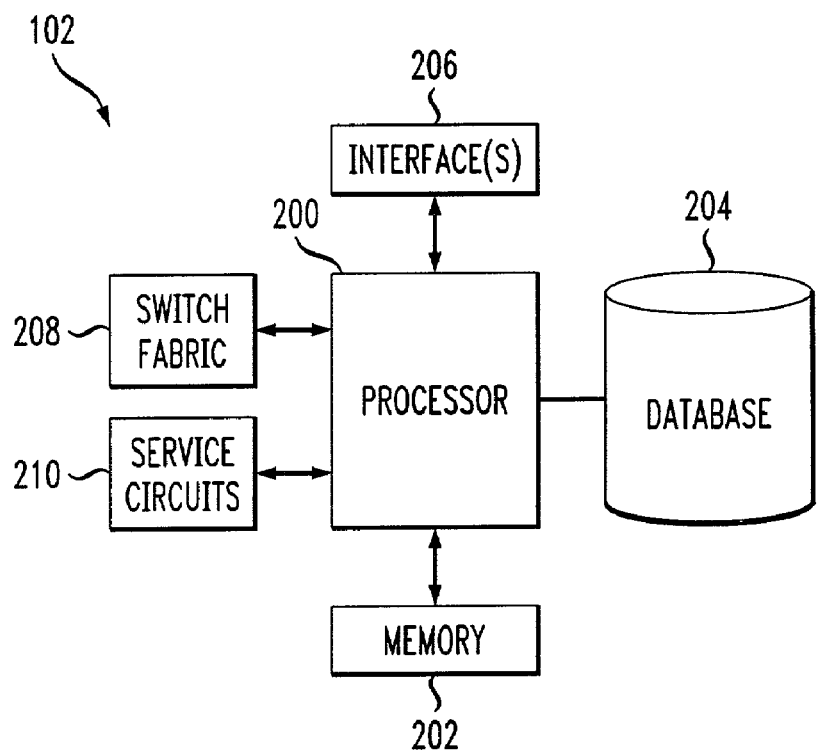
FIG. 2 is a block diagram showing an example implementation of a call complex of the FIG. 1 system.

FIG. 2 shows a more detailed view of one possible implementation of the call complex 102 in the system of FIG. 1. The call complex 102 in this implementation includes a processor 200, a memory 202, a database 204, one or more interfaces 206, a switch fabric 208, and a set of service circuits 210. The processor 200 may be implemented as a central processing unit (CPU), microprocessor, application-specific integrated circuit (ASIC) or other type of digital data processor, as well as various portions or combinations of such elements. The memory 202 may be a random access memory (RAM), a read-only memory (ROM) or portions or combinations of these and other types of electronic memory devices.

The processor 200 operating in conjunction with the memory 202 executes one or more software programs for providing secure communication and other functions within the call complex 102. The secure communication techniques of the invention will be described in greater detail below in conjunction with FIGS. 3 through 6. Such programs may be stored in memory 202 or another storage device accessible to the call complex 102 and executed by processor 200 in a conventional manner.

The database 204 may be, e.g., an optical or magnetic disk-based storage device, or other conventional storage device associated with or otherwise accessible to the call complex 102. The database 204 may be used to store, e.g., feature administration information, system configuration information, etc.

The service circuits 210 may include tone generators, announcement circuits, etc. These circuits and the interfaces 206 are controlled by processor 200 in implementing call processing functions in the call complex 102.

The call complex 102 may include additional elements which are omitted from FIG. 2 for simplicity and clarity of illustration. For example, the call complex may include a port card for each type of end unit or terminal associated therewith. In addition, it will be appreciated by those skilled in the art that the call complex 102 may be configured to support multiple end units and terminals of different types, e.g., wired deskset terminals, wireless deskset terminals, personal computers, video telephones or other advanced terminals, etc.

Also associated with the call complex 102 may be an administrator terminal (not shown) which is used to program the operation of the call complex 102 during a system administration, e.g., an initial set-up and configuration of the system or a subsequent system-level or user-level reconfiguration.

Other devices not shown in the figures may be associated with the call complex 102, such as an adjunct feature server. Such an adjunct may be physically incorporated within the call complex, and may be partially or completely implemented using other call complex elements such as processor 200 and memory 202.

The end units and terminals of the system 100 may each be configured in a manner similar to that shown in FIG. 2, e.g., may include a processor, an associated memory, and one or more interfaces as described above.

Figure 3:
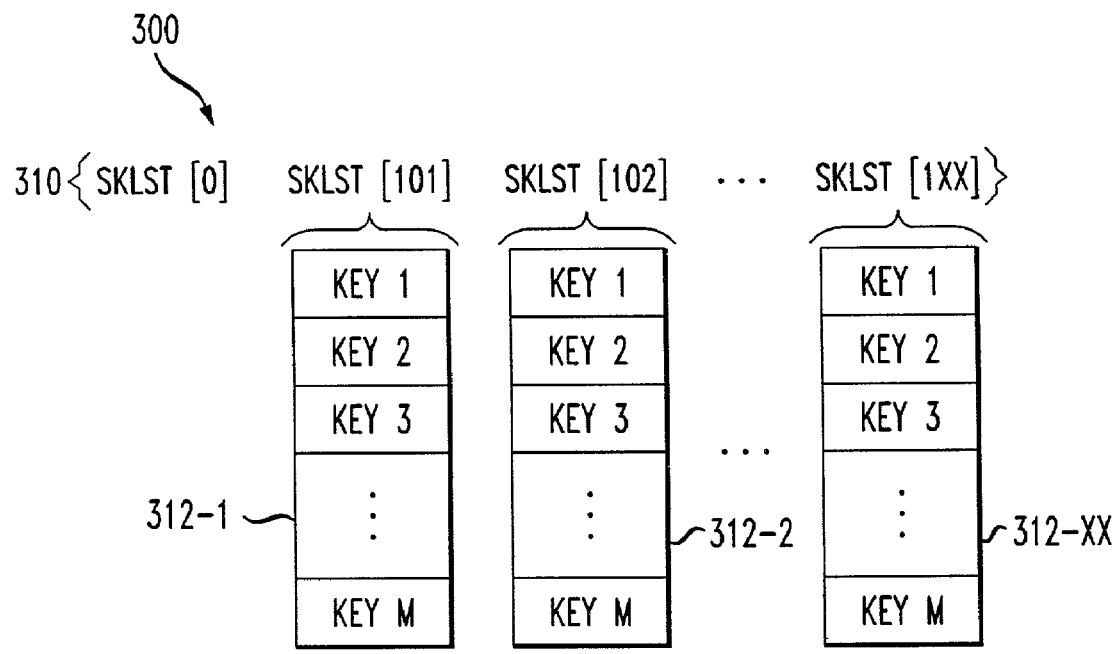
FIG. 3 shows a session key list data structure in an illustrative embodiment of the invention.

FIG. 3 illustrates a session key list data structure 300 that is utilized in the illustrative embodiment of the invention in providing secure communications between the call complex 102 and a given one of the end units 110. It is assumed for this example that the given end unit is the end unit 110-1 having Extension 101, Extension 102, . . . Extension 1XX associated therewith, although it should be understood that similar structures are preferably configured for each of the other end units 110.

The session key list data structure 300 for end unit 110-1 includes a set of session key lists 310, with each of the lists including one or more session key elements. More particularly, in the illustrative embodiment, the set of session key lists includes session key lists denoted SKLST[0], SKLST[101], SKLST[102], . . . SKLST[1XX]. The session key list SKLST[0] includes only a single element as shown, while each of the other session key lists SKLST[101], SKLST[102], . . . SKLST[1XX], corresponding to respective terminals Extension 101, Extension 102, . . . Extension 1XX, includes a table of M session keys, 312-1, 312-2, . . . 312-XX, respectively. The tables 312 are also referred to herein as session key "stacks." A suitable value of M in the illustrative embodiment is ten, although other values could also be used. The session key stacks may be processed using conventional stack processing operations, such as push or pop operations, as will be appreciated by those skilled in the art.

It should be noted that although each of the tables 312 in the FIG. 3 example includes the same number of session keys, this is by way of example and not limitation. Different session key tables may have different numbers of elements in other embodiments. Moreover, the first session key list SKLST[0] may include more than a single session key element, e.g., may include a table or stack of M session key elements like the other session key lists in FIG. 3.

The manner in which the session key list data structure 300 of FIG. 3 is utilized in providing secure communications between the call complex 102 and one or more of the end units 110 will now be described with reference to FIGS. 4, 5 and 6.

In accordance with the invention, the call complex 100 and each of the end units 110 have associated therewith a public key cryptography key pair. The call complex key pair may be viewed as a master key pair, and this master key pair and each of the end unit key pairs are preferably asymmetric key pairs. Additional details regarding conventional public key cryptography key pairs may be found in, e.g., A. J. Menezes et al., "Handbook of Applied Cryptography," CRC Press, 1997, which is incorporated by reference herein.

The above-noted key pairs for the call complex 102 and the end units 110 may be generated by an installer during an installation phase of the system 100. The public key elements of all of the key pairs are stored in the call complex 102, and the end unit key pairs are stored in their respective end units.

FIG. 4 illustrates an initialization process carried out between the call complex 102 and a given one of the end units 110 in an illustrative embodiment of the invention. This initialization may be carried out between the call complex and each of the end units, e.g., at system power up or after a system-wide reconfiguration, or may be carried out between the call complex and a particular end unit, e.g., and end unit added to an already-configured system. The call complex thus preferably authenticates each of the end units in a manner similar to that shown in FIG. 4.

In step 400 of FIG. 4, a given end unit 110 generates session key lists for its associated terminals. The session key lists are preferably in the form of the data structure 300 previously described in conjunction with FIG. 3, i.e., the set of session key lists 310 for the end unit 110-1 will include session key lists denoted SKLST[0], SKLST[101], SKLST[102], . . . SKLST[1XX]. As indicated above, the session key list SKLST[0] includes only a single element, while each of the other session key lists includes a table of M session keys. The session keys may be generated from the end unit asymmetric key pair using known techniques.

After generating the session key lists, the end unit in step 402 then sends an authentication request to the call complex, and the call complex in step 404 attempts to validate the request by determining if it has previously stored a key for the end unit. The end unit in response sends its session key list to the call complex, using its associated asymmetric key structure, as indicated in step 406. If the call complex cannot find a stored key for the end unit, all incoming messages from the end unit will be dropped immediately. Step 408 indicates that the end unit uses element SKLST[0] from the session key list for further communication with the call complex.

FIG. 5 shows a more detailed example of the authentication portion of the FIG. 4 process. This authentication protocol allows the call complex to confirm the legitimacy of the end unit, and vice-versa. References to corresponding steps of the FIG. 4 process are included in the following description of the FIG. 5 authentication protocol.

The authentication protocol in this embodiment is initiated by the end unit, i.e., one of the end units 110 of FIG. 1. The end unit generates an end unit session key as a random number, and then encrypts the end unit session key using the end unit private key, thereby generating the element ESKe. It also encrypts an end unit identification code, using the call complex public key, thereby generating the element EEUIDe. It then sends an authentication request to the call complex, as was previously indicated in conjunction with step 402 of FIG. 4. The authentication request includes the elements EEUIDe and ESKe.

The call complex then identifies the request, i.e., validates the request, as was previously indicated in conjunction with step 404 of FIG. 4. If the request is not valid, it is dropped. The call complex validates the request by first determining the end unit identification code through decryption of EEUIDe using the call complex private key. If the determined end unit identification code exists, i.e., the end unit identification code corresponds to that of a legitimate end unit authorized for communication with the call complex, the call complex retrieves from memory the end unit public key. The call complex then determines the end unit session key by decrypting ESKe using the end unit public key.

An encrypted acknowledgment ACKe is then generated by encrypting an acknowledgment ACK using the determined end unit session key. The call complex will then create session information using the IP address of the end unit and the end unit identification code. The call complex then sends the encrypted registration acknowledgment ACKe back to the end unit.

The end unit in response generates an encrypted session key list SKLSTe by encrypting a previously-generated session key list SKLST using the end unit session key. The session key list SKLST is generated as previously indicated in conjunction with step 400 of FIG. 4. The session key list SKLST for end unit 110-1, by way of example, may include the elements SKLST[0], SKLST[101], SKLST[102], . . . SKLST[1XX] described in conjunction with FIG. 3 above. The encrypted session key list SKLSTe is then sent to the call complex, as was previously indicated in conjunction with step 406 of FIG. 4.

The call complex, upon receipt of the encrypted session key list SKLSTe from the end unit, decrypts SKLSTe using the end unit session key, and resets the end unit session key to the first element in the session key list, i.e., SKLST[0]. The call complex then generates an encrypted acknowledgment ACKe by encrypting an acknowledgment ACK using the new end unit session key SKLST[0]. The call complex then sends the encrypted registration acknowledgment ACKe back to the end unit.

The end unit sets the end unit session key to the first element in the session key list, i.e., SKLST[0]. The session key SKLST[0] utilizes this session key for any further communications with the call complex during the designated session, as was previously indicated in conjunction with step 408 of FIG. 4.

As is apparent from the above example, upon authentication, each end unit utilizes element SKLST[0] in their session key list SKLST for further communications with the call complex. The call complex also provides a secure channel functionality between two or more end units during a session key negotiation phase between the end units, as will be illustrated in conjunction with FIGS. 6A through 6D below. After session key establishment between two or more end units, those end units will use the established session key for communications between them. As indicated above, any communications between a given end unit and the call complex are carried out using the first element SKLST[0] of the session key list for that end unit. At the end of a session between a given end unit and another end unit, the used session key will be destroyed and the next one in the appropriate stack-based element of the session key list for the given end unit will be utilized for the next session. The given end unit is responsible for creating a new session key list whenever such a list is required, through further interaction with the call complex in a manner similar to that previously described in conjunction with FIGS. 4 and 5. When a new session key list is created by the given end unit and the end unit is again authenticated by the call complex, the new SKLST[0] element will then be used for further communications between them. Any end unit can therefore re-initiate the initialization process of FIG. 4 in order to recreate their session key list.

It should be noted that any incoming messages to a given end unit are encrypted using an appropriate session key determined in the manner described above. If any such incoming messages cannot be properly decrypted at the end unit, these should be dropped immediately.

Figure 6A:
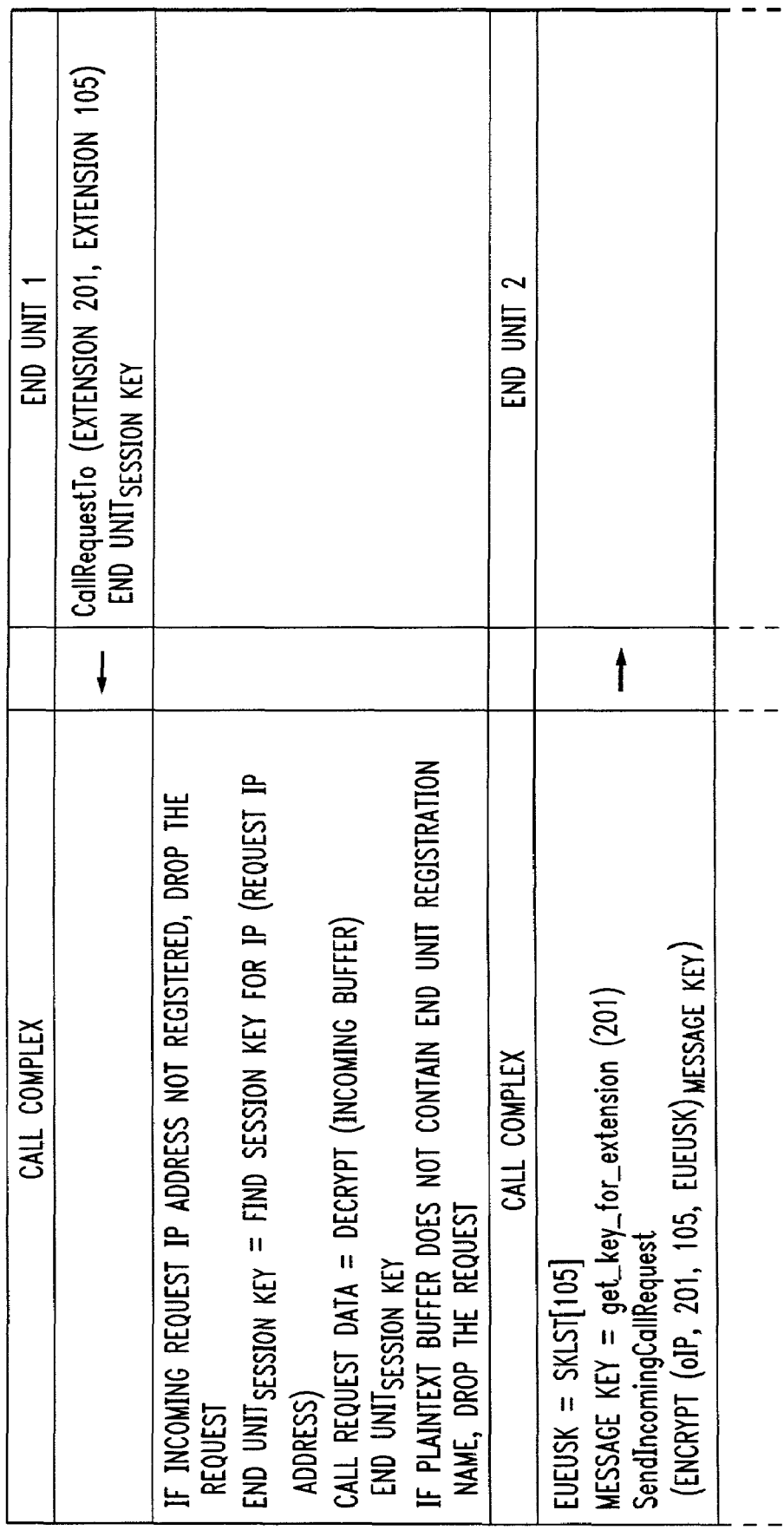
Figure 6A:
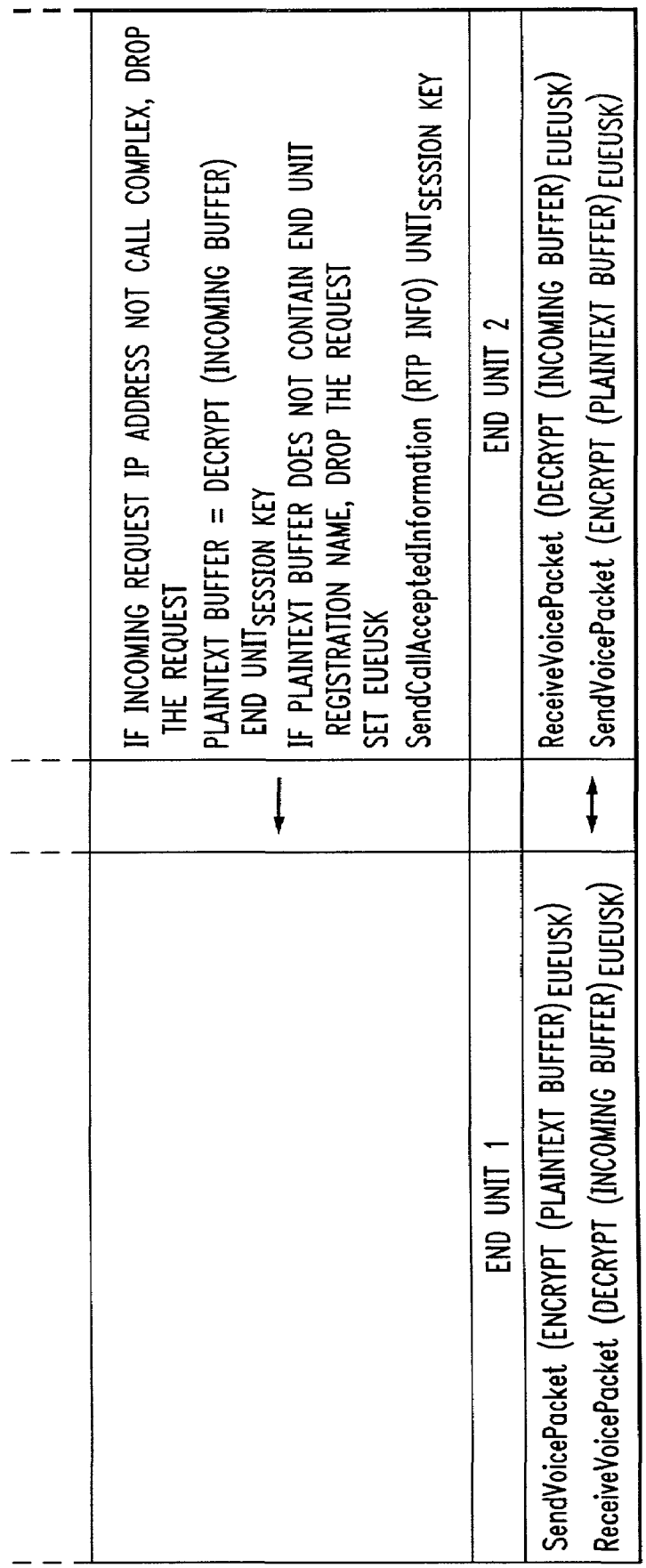
Figure 6B:
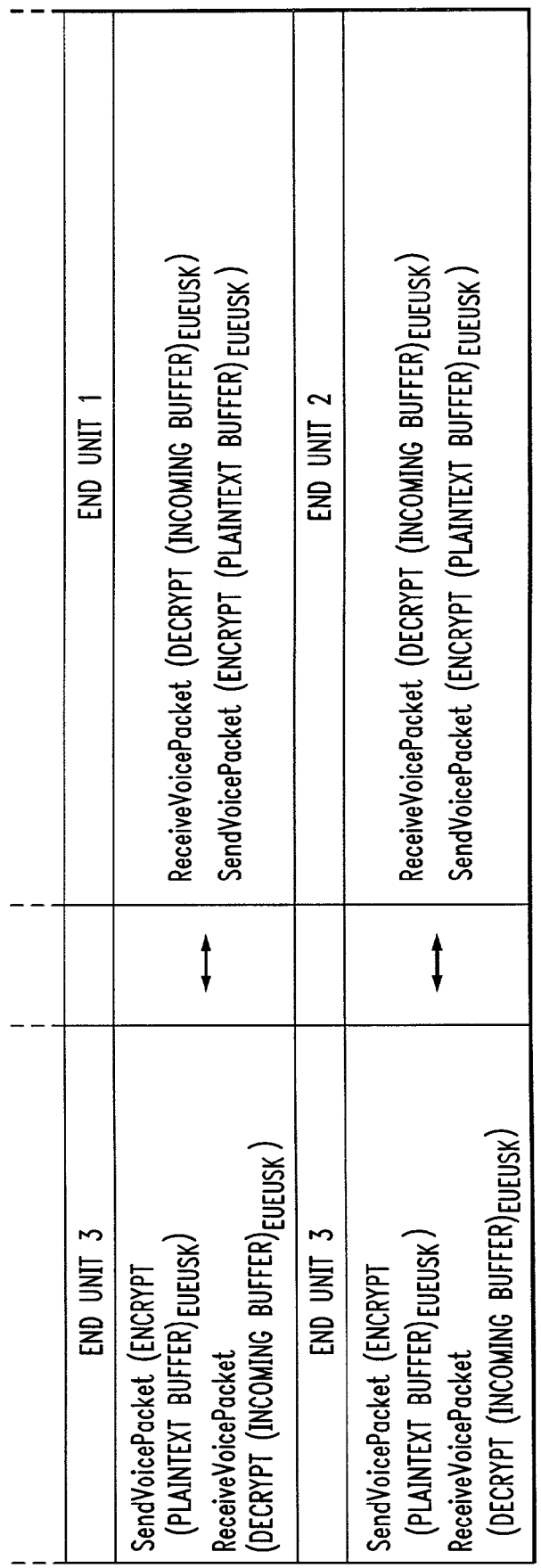
Figure 6C:
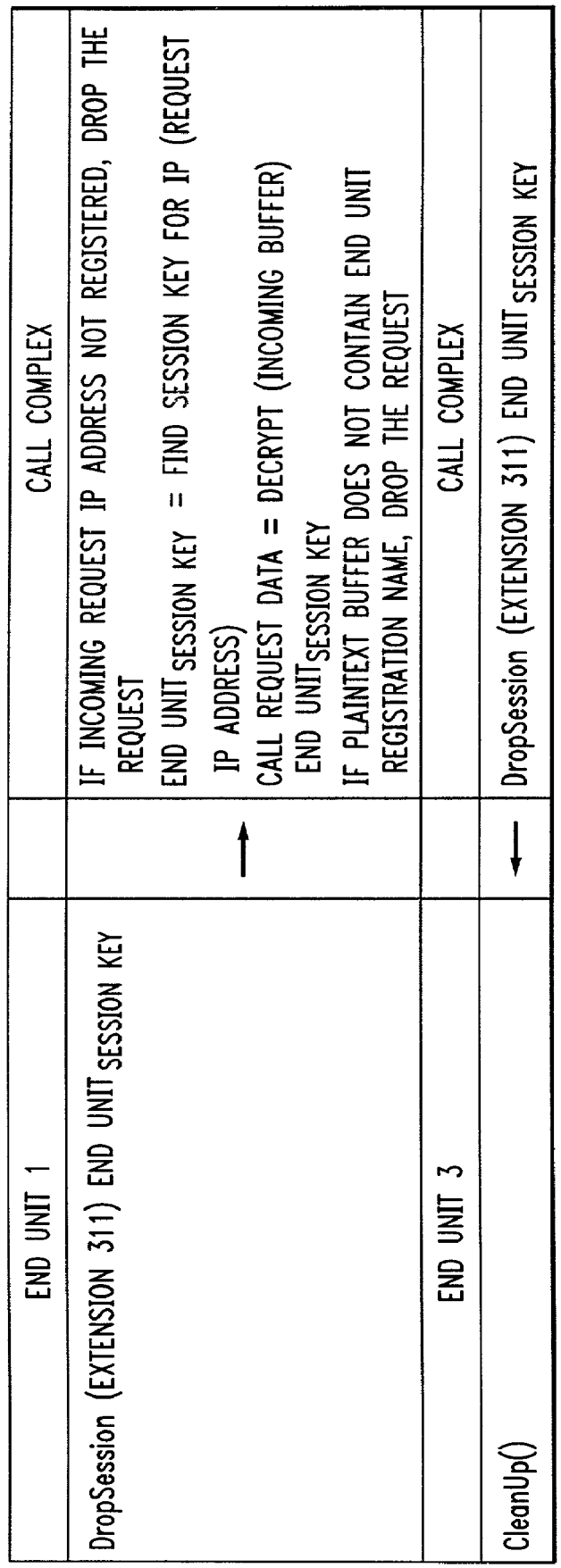

FIGS. 6A through 6D illustrate the operation of a call process initiated by end unit 110-1, also referred to as End Unit 1, of the FIG. 1 system. More particularly, FIG. 6A shows the establishment of a secure communication between a terminal (Extension 105) of End Unit 1 and a terminal (Extension 201) of another end unit, i.e., end unit 110-2 of FIG. 1, also referred to as End Unit 2. FIG. 6B illustrates the manner in which a terminal (Extension 311) of yet another end unit, i.e., end unit 110-3 of FIG. 1, also referred to as End Unit 3, is conferenced into the ongoing secure communication between the terminals of End Units 1 and 2. FIG. 6C illustrates the manner in which End Unit 1 drops the terminal of End Unit 3 from the ongoing secure communication between the terminals of End Units 1 and 2. FIG. 6D shows the ongoing secure communication between the terminals of End Units 1 and 2, and the manner in which this secure communication is terminated and a new session key is determined for the originating terminal (Extension 105) through interaction between End Unit 1 and the call complex. Each of these figures will be described in greater detail below.

Referring to FIG. 6A, End Unit 1 initiates a call request from one of its terminals, corresponding to Extension 105, to another terminal, corresponding to Extension 201 associated with End Unit 2. The call complex first determines if the IP address of the end unit making the incoming call request (End Unit 1) has previously registered with the call complex, e.g., using the initialization process of FIG. 4. If not, the request is dropped. Otherwise, the call complex uses the IP address of the end unit making the call request (End Unit 1) to determine the appropriate end unit session key. The call complex then obtains call request data by decrypting an incoming buffer using the determined end unit session key.

In this embodiment, the term "incoming buffer" refers to a buffer, associated with the call complex memory, for storing encrypted information. This is in contrast to the term "plaintext buffer," which refers to a buffer, also associated with the call complex memory, for storing corresponding plaintext information, i.e., the unencrypted information that results from decrypting the encrypted information in the incoming buffer. However, it is to be appreciated that the invention does not require any particular buffer configuration.

The resulting call request data is present in its unencrypted form in the above-noted plaintext buffer. The call complex examines the plaintext buffer to determine if the call request data includes the appropriate end unit registration name for End Unit 1, e.g., the end unit identification referred to in the authentication protocol of FIG. 5. If not, the call request is dropped. Otherwise, the call process continues with the call complex determining an end unit to end unit session key EUEUSK as the top key of the stack 312-5 of session key list SKLST[105]. The call complex then determines a message key as the appropriate session key for Extension 201, e.g., determines the session key as the top key of a stack associated with session key list SKLST[201] established by End Unit 2 for Extension 201.

The call complex then sends the incoming call request in encrypted form to End Unit 2 as indicated in FIG. 6A. The request sent to End Unit 2 is encrypted using the above-noted message key, and preferably includes the originator end unit IP address and real-time protocol (RTP) port information (collectively denoted oIP), identification codes for the destination terminal (Extension 201) and the originating terminal (Extension 105), and the end unit to end unit session key EUEUSK.

Additional information regarding RTP can be found in, e.g., http://www.ietf.org/internet-drafts/draft-ietf-avt-rtp-new-03.txt. It should be noted that a circuit-switched stream or other type of non-RTP stream can be indirectly controlled by, e.g., first transforming it into an RTP stream, typically using a conventional circuit-packet gateway. It should be emphasized that this is by way of example only, and the invention can be implemented using other protocols, and other arrangements of switches and devices.

End Unit 2 upon receipt of the incoming call request from the call complex first checks that the IP address of the incoming request is that of the call complex. If not, the request is dropped. Otherwise, the process continues with End Unit 2 decrypting the incoming buffer containing the incoming call request information, using the end unit session key SKLST[0] established between End Unit 2 and the call complex in the manner described previously. If the plaintext buffer containing the decrypted call request information does not include the registration name of End Unit 2, e.g., the above-noted end unit identification code for End Unit 2, the request is dropped. Otherwise, End Unit 2 sets the session key for the incoming call request to the end unit to end unit session key EUEUSK, and sends a call accepted indication to End Unit 1. The call accepted indication preferably includes RTP information of End Unit 2, encrypted using the end unit to end unit session key EUEUSK.

End Unit 1 upon receipt of the call accepted indication from End Unit 2, communicates via encrypted voice packets with End Unit 2 as indicated in the figure. More particularly, End Unit 1 sends a given voice packet from the plaintext buffer by encrypting it using the end unit to end unit session key EUEUSK and sending the encrypted packet to End Unit 2. End Unit 2 receives the encrypted voice packet in its incoming buffer and decrypts it using the end unit to end unit session key EUEUSK. Similarly, End Unit 2 sends a given voice packet from its plaintext buffer by encrypting it using the end unit to end unit session key EUEUSK and sending the encrypted packet to End Unit 1. End Unit 1 receives the encrypted voice packet in its incoming buffer and decrypts it using the end unit to end unit session key EUEUSK. This process can continue for the duration of the secure communication.

As indicated previously, the remaining figures, i.e., FIGS. 6B, 6C and 6D, illustrate the addition of another terminal (Extension 311) to the ongoing secure communication, the subsequent dropping of that terminal from the call, and the termination of the secure communication with the updating of the session key lists to accommodate subsequent secure communications involving the same originating terminal (Extension 105).

With reference now to FIG. 6B, End Unit 1 sends a conference request to the call complex. The conference request is a request to conference Extension 311, associated with end unit 110-3 (End Unit 3), into the ongoing secure communication originated by Extension 105. The conference request is encrypted using the End Unit 1 session key SKLST[0] previously authenticated for communication between End Unit 1 and the call complex. The call complex upon receipt of the conference request first determines if the IP address of the end unit making the conference request (End Unit 1) has previously registered with the call complex, e.g., using the initialization process of FIG. 4. If not, the request is dropped. Otherwise, the call complex uses the IP address of the end unit making the conference request (End Unit 1) to determine the appropriate end unit session key. The call complex then obtains conference request data by decrypting an incoming buffer using the determined end unit session key, i.e., the end unit session key SKLST[0] previously authenticated for communication between End Unit 1 and the call complex.

The resulting conference request data is present in its unencrypted form in the above-noted plaintext buffer of the call complex. The call complex examines the plaintext buffer to determine if the conference request data includes the appropriate end unit registration name for End Unit 1, e.g., the end unit identification referred to in the authentication protocol of FIG. 5. If not, the conference request is dropped. Otherwise, the process continues with the call complex determining an end unit to end unit session key EUEUSK as the top key of the stack 312-5 of session key list SKLST[105]. The call complex then determines a message key as the appropriate session key for Extension 311, e.g., determines the session key as the top key of a stack associated with session key list SKLST[311] established by End Unit 3 for Extension 311.

The call complex then sends the incoming conference request in encrypted form to End Unit 3 as indicated in FIG. 6B. The request sent to End Unit 3 is encrypted using the above-noted message key, and preferably includes the originator end unit IP address and RTP port information (collectively denoted oIP), identification codes for the destination terminal (Extension 311) and the originating terminal (Extension 105), and the end unit to end unit session key EUEUSK.

End Unit 3 upon receipt of the incoming conference request from the call complex first checks that the IP address of the incoming request is that of the call complex. If not, the request is dropped. Otherwise, the process continues with End Unit 3 decrypting the incoming buffer containing the incoming conference request information, using the end unit session key SKLST[0] established between End Unit 3 and the call complex in the manner described previously. If the plaintext buffer containing the decrypted conference request information does not include the registration name of End Unit 3, e.g., the above-noted end unit identification code for End Unit 3, the request is dropped. Otherwise, End Unit 3 sets the session key for the incoming conference request to the end unit to end unit session key EUEUSK, and sends a conference accepted indication to End Unit 1. The conference accepted indication preferably includes RTP information of End Unit 3, encrypted using the end unit to end unit session key EUEUSK.

End Unit 1 upon receipt of the conference accepted indication from End Unit 3, communicates via encrypted voice packets with End Unit 3 as indicated in the figure. More particularly, End Unit 1 sends a given voice packet from the plaintext buffer by encrypting it using the end unit to end unit session key EUEUSK and sending the encrypted packet to End Unit 3. End Unit 3 receives the encrypted voice packet in its incoming buffer and decrypts it using the end unit to end unit session key EUEUSK. Similarly, End Unit 3 sends a given voice packet from its plaintext buffer by encrypting it using the end unit to end unit session key EUEUSK and sending the encrypted packet to End Unit 1. End Unit 1 receives the encrypted voice packet in its incoming buffer and decrypts it using the end unit to end unit session key EUEUSK. Extension 311 has thus been conferenced into the ongoing secure communication between Extensions 105 and 201.

FIG. 6C illustrates the subsequent dropping of the conferenced-in Extension 311 from the ongoing secure communication between Extensions 105 and 201. End Unit 1 sends to the call complex a request to drop Extension 311 from the session. The request is encrypted using the end unit session key SKLST[0] previously authenticated for communication between End Unit 1 and the call complex. The call complex upon receipt of the drop request first determines if the IP address of the end unit making the drop request (End Unit 1) has previously registered with the call complex, e.g., using the initialization process of FIG. 4. If not, the request itself is dropped. Otherwise, the call complex uses the IP address of the end unit making the conference request (End Unit 1) to determine the appropriate end unit session key. The call complex then obtains drop request data by decrypting an incoming buffer using the determined end unit session key, i.e., the end unit session key SKLST[0] previously authenticated for communication between End Unit 1 and the call complex.

The resulting drop request data is present in its unencrypted form in the plaintext buffer of the call complex. The call complex examines the plaintext buffer to determine if the drop request data includes the appropriate end unit registration name for End Unit 1, e.g., the end unit identification referred to in the authentication protocol of FIG. 5. If not, the drop request itself is dropped. Otherwise, the process continues with the call complex directing End Unit 3 to drop the session. This drop instruction is encrypted using the end unit session key SKLST[0] established for communication between End Unit 3 and the call complex. End Unit 3 then initiates a cleanup procedure as indicated in the figure. This exemplary procedure, denoted CleanUp( ), may include or otherwise involve operations such as dropping a session key, deleting session key information, conventional telephony-related "housekeeping" operations, etc.

The dropping of Extension 311 from the ongoing call between Extension 105 and Extension 201 also involves obtaining a new session key for Extension 105 from the SKLST[105] stack. This process is illustrated in the first portion of FIG. 6D.

As indicated in FIG. 6D, the call complex generates a new end unit to end unit session key EUEUSK-NEW by taking the next key from the SKLST[105] stack. The call complex then determines a new message key as the appropriate session key for Extension 201, e.g., determines the next session key as the next key in a stack associated with session key list SKLST[201] established by End Unit 2 for Extension 201.

The call complex then sends a new session key request in encrypted form to End Unit 2 as indicated in FIG. 6D. The request sent to End Unit 2 is encrypted using the above-noted message key, and preferably includes the originator end unit IP address and RTP port information (collectively denoted oIP), identification codes for the destination terminal (Extension 201) and the originating terminal (Extension 105), and the new end unit to end unit session key EUEUSK-NEW.

End Unit 2 upon receipt of the incoming new session key request from the call complex first checks that the IP address of the incoming request is that of the call complex. If not, the request is dropped. Otherwise, the process continues with End Unit 2 decrypting the incoming buffer containing the incoming new session key request information, using the end unit session key SKLST[0] established between End Unit 2 and the call complex in the manner described previously. If the plaintext buffer containing the decrypted call request information does not include the registration name of End Unit 2, e.g., the above-noted end unit identification code for End Unit 2, the request is dropped. Otherwise, End Unit 2 sets the new session key for the incoming call request to the new end unit to end unit session key EUEUSK-NEW, and sends a new session key confirmation back to the call complex. The confirmation is encrypted using the end unit session key SKLST[0] previously authenticated for communications between End Unit 1 and the call complex.

End Unit 1 then continues to communicate with End Unit 2 via encrypted voice packets as before, but with the new end unit to end unit session key EUEUSK-NEW being used in place of the previous end unit to end unit session key EUEUSK.

When the secure communication between Extension 105 and Extension 201 is to be terminated, End Unit 1 sends an end of session instruction to End Unit 2, encrypted using the new end unit to end unit session key EUEUSK-NEW. End Unit 2 then initiates the above-noted cleanup procedure.

End Unit 1 then creates a first new session key for Extension 105, encrypts the first new session key and a corresponding end unit sub number EUSN using the End Unit 1 private key, and sends the resulting encrypted element EUSKe to the call complex as a request to provide a new session key. The call complex upon receipt of the new session key request first determines if the IP address of the end unit sending the new session key (End Unit 1) has previously registered with the call complex, e.g., using the initialization process of FIG. 4. If not, the incoming request is dropped. Otherwise, the call complex uses the IP address of the end unit making the request (End Unit 1) to determine the appropriate end unit session key. The call complex then obtains new session key request data by decrypting an incoming buffer using the determined end unit session key, i.e., the end unit session key SKLST[0] previously authenticated for communication between End Unit 1 and the call complex.

The resulting new session key request data is present in its unencrypted form in the plaintext buffer of the call complex. The call complex examines the plaintext buffer to determine if the new session key request data includes the appropriate end unit registration name for End Unit 1, e.g., the end unit identification referred to in the authentication protocol of FIG. 5. If not, the new session key request is dropped. Otherwise, the process continues with the call complex updating the session key list SKLST[105] for Extension 105 by adding the new session key received from End Unit 1 as the top key on the corresponding stack.

FIG. 6D indicates that the above-described new session key generation process is then repeated by End Unit 1 and the call complex. Although only a single repeat is shown in the figure, the new session key generation process may be repeated more than one time, e.g., it may be repeated a particular number of times required to maintain a desired minimum number of keys in the stack for the Extension 105 session key list SKLST[105].

Advantageously, the above-described secure communication techniques protect the call complex 102, end units 110 and terminals 112 of the system 100 from IP spoofing, denial of service, and other attacks. The invention thus allows IP communications to be implemented in a secure and efficient manner within such a call processing system.

As previously noted, one or more of the call processing functions described above in conjunction with the illustrative embodiments of the invention may be implemented in whole or in part in the call complex 102, e.g., in call processing software thereof utilizing processor 200 and memory 202. Other suitable combinations of hardware and/or software may be used to implement the call processing functions of the invention.

It should again be emphasized the above-described embodiments are illustrative only. For example, alternative embodiments may utilize different switch, network, end unit and terminal configurations, different cryptographic techniques, and different protocols for adding, dropping, conferencing and other call processing functions. As another example, session keys may be changed within a given session based on expiration of a specified period of time, e.g., every 15 minutes, every hour, etc. These and numerous other alternative embodiments within the scope of the following claims will be apparent to those skilled in the art.

What is claimed is:

1. In a call processing system, a method for providing secure communications between two or more end units of the system via a communication switch of the system, each of the end units being coupled between the communication switch and one or more terminals of the system, the method comprising the steps of:

storing in a memory associated with the communication switch a plurality of sets of session key lists including a set of session key lists for each of the end units;

selecting as an end unit to end unit session key a session key from a session key list in a given one of the sets of session key lists associated with an originating end unit, the selected end unit to end unit session key being utilizable in providing secure communications between the originating end unit and at least one other end unit via the communication switch;

wherein the end units have respective pluralities of terminals associated therewith, a given one of the end units being configured to provide an interface between its associated terminals and the communication switch;

wherein the given set of session key lists associated with the originating end unit comprises session key lists for respective terminals associated with that end unit; and wherein the given set of session key lists is generated in the originating end unit and transmitted from the originating end unit to the communication switch in conjunction with an authentication protocol carried out between the originating end unit and the communication switch.

2. The method of claim 1 wherein the set of session key lists for a given one of the end units is supplied to the communication switch in encrypted form by that end unit as part of an authentication protocol carried out between that end unit and the communication switch.

3. The method of claim 1 wherein a first session key element of the set of session key lists is utilizable for providing secure communications between the given one of the end units and the communication switch subsequent to completion of the authentication protocol.

4. In a call processing system, a method for providing secure communications between two or more end units of the system via a communication switch of the system, the method comprising the steps of:

storing in a memory associated with the communication switch a plurality of sets of session key lists including a set of session key lists for each of the end units;

selecting as an end unit to end unit session key a session key from a session key list in a given one of the sets of session key lists associated with an originating end unit, the selected end unit to end unit session key being utilizable in providing secure communications between the originating end unit and at least one other end unit via the communication switch;

wherein the given one of the sets of session key lists is stored in the form of a data structure comprising at least a first session key element and a plurality of stack-based session key lists, each of the stack-based session key lists comprising a plurality of session keys associated with a particular terminal coupled to the originating end unit.

5. The method of claim 4 wherein the first session key element is utilizable in providing secure communication between the originating end point and the communication switch.

6. The method of claim 4 wherein the selected session key is selected from a designated one of the plurality of stack-based session key lists corresponding to a particular terminal which originated the secure communications via the originating end unit.

7. The method of claim 6 wherein upon completion of the secure communications originated by the particular terminal, the corresponding originating end unit generates at least one additional session key which is added to the stack-based session key list for that terminal and is supplied to the communication switch for storage, the additional session key being utilizable in providing subsequent secure communications between the originating end unit and at least one other end unit.

8. In a call processing system, a method for providing secure communications between two or more end units of the system via a communication switch of the system, the method comprising the steps of:

storing in a memory associated with the communication switch a plurality of sets of session key lists including a set of session key lists for each of the end units;

selecting as an end unit to end unit session key a session key from a session key list in a given one of the sets of session key lists associated with an originating end unit, the selected end unit to end unit session key being utilizable in providing secure communications between the originating end unit and at least one other end unit via the communication switch;

wherein a particular one of the session key lists associated with a particular terminal coupled to the originating end unit is selected for use in providing secure communications for a call originating at the particular terminal.

9. The method of claim 8 wherein at least one additional terminal coupled to another end unit utilizes the selected session key to participate in the call originating at the particular terminal.

10. The method of claim 9 wherein the additional terminal comprises a corresponding destination terminal of the call originating at the particular terminal.

11. The method of claim 9 wherein the additional terminal comprises an additional terminal other than a destination terminal of the call, the additional terminal being conferenced into the call originating at the particular terminal subsequent to connection of the call to the destination terminal.

12. The method of claim 11 wherein a new session key is selected from the session key list associated with the particular terminal after the additional terminal conferenced into the call is subsequently dropped from the call.

13. An apparatus for use in a call processing system for providing secure communications between two or more end units of the system via a communication switch of the system, each of the end units being coupled between the communication switch and one or more terminals of the system, the apparatus comprising:
   a memory associated with the communication switch and operative to store a plurality of sets of session key lists including a set of session key lists for each of the end units; and
   a processor coupled to the memory, the processor being operative to select as an end unit to end unit session key a session key from a session key list in a given one of the sets of session key lists associated with an originating end unit, the selected end unit to end unit session key being utilizable in providing secure communications between the originating end unit and at least one other end unit via the communication switch;
   wherein the end units have respective pluralities of terminals associated therewith, a given one of the end units being configured to provide an interface between its associated terminals and the communication switch;
   wherein the given set of session key lists associated with the originating end unit comprises session key lists for respective terminals associated with that end unit; and
   wherein the given set of session key lists is generated in the originating end unit and transmitted from the originating end unit to the communication switch in conjunction with an authentication protocol carried out between the originating end unit and the communication switch.

14. The apparatus of claim 13 wherein the set of session key lists for a given one of the end units is supplied to the communication switch in encrypted form by that end unit as part of an authentication protocol carried out between that end unit and the communication switch.

15. The apparatus of claim 13 wherein a first session key element of the set of session key lists is utilizable for providing secure communications between the given one of the end units and the communication switch subsequent to completion of the authentication protocol.

16. An apparatus for use in a call processing system for providing secure communications between two or more end units of the system via a communication switch of the system, the apparatus comprising:
   a memory associated with the communication switch and operative to store a plurality of sets of session key lists including a set of session key lists for each of the end units; and
   a processor coupled to the memory, the processor being operative to select as an end unit to end unit session key a session key from a session key list in a given one of the sets of session key lists associated with an originating end unit, the selected end unit to end unit session key being utilizable in providing secure communications between the originating end unit and at least one other end unit via the communication switch;
   wherein the given one of the sets of session key lists is stored in the form of a data structure comprising at least a first session key element and a plurality of stack-based session key lists, each of the stack-based session key lists comprising a plurality of session keys associated with a particular terminal coupled to the originating end unit.

17. The apparatus of claim 16 wherein the first session key element is utilizable in providing secure communication between the originating end point and the communication switch.

18. The apparatus of claim 16 wherein the selected session key is selected from a designated one of the plurality of stack-based session key lists corresponding to a particular terminal which originated the secure communications via the originating end unit.

19. The apparatus of claim 18 wherein upon completion of the secure communications originated by the particular terminal, the corresponding originating end unit generates at least one additional session key which is added to the stack-based session key list for that terminal and is supplied to the communication switch for storage, the additional session key being utilizable in providing subsequent secure communications between the originating end unit and at least one other end unit.

20. An apparatus for use in a call processing system for providing secure communications between two or more end units of the system via a communication switch of the system, the apparatus comprising:
   a memory associated with the communication switch and operative to store a plurality of sets of session key lists including a set of session key lists for each of the end units; and
   a processor coupled to the memory, the processor being operative to select as an end unit to end unit session key a session key from a session key list in a given one of the sets of session key lists associated with an originating end unit, the selected end unit to end unit session key being utilizable in providing secure communications between the originating end unit and at least one other end unit via the communication switch;
   wherein a particular one of the session key lists associated with a particular terminal coupled to the originating end unit is selected for use in providing secure communications for a call originating at the particular terminal.

21. The apparatus of claim 20 wherein at least one additional terminal coupled to another end unit utilizes the selected session key to participate in the call originating at the particular terminal.

22. The apparatus of claim 21 wherein the additional terminal comprises a corresponding destination terminal of the call originating at the particular terminal.

23. The apparatus of claim 21 wherein the additional terminal comprises an additional terminal other than a destination terminal of the call, the additional terminal being conferenced into the call originating at the particular terminal subsequent to connection of the call to the destination terminal.

24. The apparatus of claim 23 wherein a new session key is selected from the session key list associated with the particular terminal after the additional terminal conferenced into the call is subsequently dropped from the call.

25. An article of manufacture comprising a machine-readable storage medium storing one or more programs for use in a call processing system for providing secure communications between two or more end units of the system via a communication switch of the system, each of the end units being coupled between the communication switch and one or more terminals of the system, wherein the one or more programs when executed implement the steps of:

storing in a memory associated with the communication switch a plurality of sets of session key lists including a set of session key lists for each of the end units;

selecting as an end unit to end unit session key a session key from a session key list in a given one of the sets of session key lists associated with an originating end unit, the selected end unit to end unit session key being utilizable in providing secure communications between the originating end unit and at least one other end unit via the communication switch;

wherein the end units have respective pluralities of terminals associated therewith, a given one of the end units being configured to provide an interface between its associated terminals and the communication switch;

wherein the given set of session key lists associated with the originating end unit comprises session key lists for respective terminals associated with that end unit; and wherein the given set of session key lists is generated in the originating end unit and transmitted from the originating end unit to the communication switch in conjunction with an authentication protocol carried out between the originating end unit and the communication switch.

* * * * *